US012474053B2

(12) United States Patent
Pucci et al.

(10) Patent No.: US 12,474,053 B2
(45) Date of Patent: Nov. 18, 2025

(54) FUEL INJECTOR AND FUEL NOZZLE FOR A GAS TURBINE, AND GAS TURBINE ENGINE INCLUDING THE NOZZLE

(71) Applicant: Nuovo Pignone Tecnologie S.r.l, Florence (IT)

(72) Inventors: Egidio Pucci, Florence (IT); Stefano Gori, Florence (IT); Roberto Meloni, Florence (IT)

(73) Assignee: Nuovo Pignone Tecnologie S.r.l., Florence (IT)

( * ) Notice: Subject to any disclaimer, the term of this patent is extended or adjusted under 35 U.S.C. 154(b) by 0 days.

(21) Appl. No.: 18/559,497

(22) PCT Filed: May 10, 2022

(86) PCT No.: PCT/EP2022/025215
§ 371 (c)(1),
(2) Date: Nov. 7, 2023

(87) PCT Pub. No.: WO2022/238011
PCT Pub. Date: Nov. 17, 2022

(65) Prior Publication Data
US 2024/0240793 A1 Jul. 18, 2024

(30) Foreign Application Priority Data
May 12, 2021 (IT) ........................ 102021000012134

(51) Int. Cl.
*F23R 3/28* (2006.01)
*F02C 7/232* (2006.01)

(52) U.S. Cl.
CPC ................ *F23R 3/28* (2013.01); *F23R 3/286* (2013.01); *F02C 7/232* (2013.01)

(58) Field of Classification Search
CPC .... F23R 3/28; F23R 3/286; F23R 3/36; F23R 3/10; F23R 3/12; F23R 3/14; F23D 14/02; F23D 11/101
See application file for complete search history.

(56) References Cited

U.S. PATENT DOCUMENTS 4,850,194 A 7/1989 Cornel
5,372,008 A * 12/1994 Sood ........................ F23D 14/78 60/737

(Continued)

FOREIGN PATENT DOCUMENTS

JP S63161317 A 7/1988
JP 2014517250 A 7/2014

(Continued)

OTHER PUBLICATIONS

"Convex Polygon". Wikipedia, The Free Encyclopedia, Apr. 2020. Retrieved from Internet Archive WayBackMachine on Aug. 8, 2024 from <https://web.archive.org/web/20200429180433/https://en.wikipedia.org/wiki/Convex_polygon> (Year: 2020).*

*Primary Examiner* — Alain Chau
(74) *Attorney, Agent, or Firm* — Paul Frank + Collins P.C.

(57) ABSTRACT

A fuel injector comprises a fuel infeed chamber and a centerbody extending along a longitudinal axis from the fuel infeed chamber to a distal end of the centerbody. An outer sleeve surrounds the centerbody and forms an annular premix chamber between the outer sleeve and the centerbody. The centerbody comprises a distal tip projecting outside the annular premix chamber, beyond the distal end of the outer sleeve.

22 Claims, 13 Drawing Sheets

(56) References Cited

U.S. PATENT DOCUMENTS

| | | | | |
|---|---|---|---|---|
| 5,487,659 | A | 1/1996 | Eroglu et al. | |
| 7,610,759 | B2 * | 11/2009 | Yoshida | F23C 7/004 60/737 |
| 9,677,505 | B2 * | 6/2017 | Savary | F23R 3/60 |
| 10,295,190 | B2 * | 5/2019 | Boardman | F23R 3/10 |
| 2006/0154192 | A1 | 7/2006 | Flohr et al. | |
| 2008/0104961 | A1 * | 5/2008 | Bunker | F23D 14/62 60/737 |
| 2009/0165435 | A1 * | 7/2009 | Koranek | F23R 3/343 60/39.463 |
| 2012/0094239 | A1 | 4/2012 | Miura et al. | |
| 2012/0208137 | A1 * | 8/2012 | Kirzhner | F23R 3/36 431/12 |
| 2014/0116384 | A1 * | 5/2014 | Savary | F23R 3/14 123/430 |
| 2014/0331678 | A1 * | 11/2014 | Cramer | F23R 3/28 60/751 |
| 2015/0323187 | A1 * | 11/2015 | Gomez del Campo | F02C 7/266 60/737 |
| 2017/0074521 | A1 * | 3/2017 | Horikawa | F23R 3/286 |
| 2017/0082291 | A1 * | 3/2017 | Horikawa | F23R 3/34 |
| 2017/0321609 | A1 | 11/2017 | Ogata et al. | |
| 2018/0128491 | A1 | 5/2018 | Boardman et al. | |
| 2018/0128492 | A1 | 5/2018 | Boardman et al. | |
| 2019/0032561 | A1 * | 1/2019 | Stoia | F23R 3/343 |
| 2020/0173662 | A1 | 6/2020 | Boehm et al. | |
| 2020/0263873 | A1 | 8/2020 | Boardman et al. | |

FOREIGN PATENT DOCUMENTS

| | | | |
|---|---|---|---|
| JP | 2016090141 | A | 5/2016 |
| WO | 2007/113130 | A1 | 10/2007 |

* cited by examiner

FUEL INJECTOR AND FUEL NOZZLE FOR A GAS TURBINE, AND GAS TURBINE ENGINE INCLUDING THE NOZZLE

TECHNICAL FIELD

The subject matter disclosed herein generally relates to gas turbine engines. More particularly, the disclosure concerns a pre-mixing fuel nozzle for gas turbine engine combustors, as well as to gas turbine engine combustors.

BACKGROUND ART

Gas turbine engines, for both aircraft and industrial applications, include at least one combustor in which fuel, either in gaseous or liquid form, is mixed with a compressed air stream and burned to generate a flow of hot, pressurized combustion gas. The combustion gas is expanded in a turbine including one or more turbine stages to generate mechanical power. Part of the mechanical power generated by the turbine is used to drive the compressor of the gas turbine engine and to support continuous supply of combustion air to the combustor. The remaining available power is used to either drive a load, such as an electric generator or a compressor, or to generate a thrust for aircraft propulsion.

The combustor includes a combustion chamber and a plurality of fuel nozzles, which have the function of introducing a liquid or gaseous fuel into the stream of compressed air from the air compressor and obtain a mixture of combustion air and fuel. At start-up, the mixture is ignited to burn the fuel. By continuing feed of compressed air and fuel to the combustor, the combustion process is maintained to generate a continuous flow of compressed, hot combustion gas to operate the turbine.

Control of the flame in the combustor is one of the critical aspects of fuel nozzle design. One of the aims of nozzle design is reduction of noxious emissions, such as nitrogen oxides (NOx), carbon monoxide and unburned hydrocarbons. Further points of concern are the reduction of flame instability, the reduction of acoustic pressure dynamics or oscillations (i.e. combustion noise) and the reduction of lean blowout risks, as well as the reduction of the formation of hot spots in the combustion chambers, due to asymmetrical temperature profiles, for instance.

In this context, an important aspect is the stability of the shape and spatial position of the flame. Changes in the flame shape and flame position during operation of the combustor may adversely affect noxious emissions of the gas turbine engine and increase acoustic pressure dynamics and oscillations.

An improved fuel nozzle design aimed at reducing flame instability in terms of shape and position would, therefore, be welcomed in the art.

SUMMARY

In embodiments disclosed herein, the fuel injector includes a fuel infeed chamber having an end wall, and a centerbody extending along a longitudinal axis from the end wall to a distal end of the centerbody. An outer sleeve surrounds the centerbody and extends along the axis of the centerbody, from the end wall to a distal end of the outer sleeve, opposite the fuel infeed chamber. An annular premix chamber is thus defined between the outer sleeve and the centerbody.

The premix chamber has an annular outlet at the distal end of the outer sleeve. The centerbody includes a distal tip ending at the distal end of the centerbody and projecting outside the premix chamber, beyond the distal end of the outer sleeve, inside the combustion chamber.

According to further embodiments disclosed herein, the centerbody has an additional fluid conduit extending along the centerbody and fluidly coupled to at least one outlet port at the distal tip of the centerbody. In use, fuel, air or an air/fuel mixture can be delivered through the additional fluid conduit towards the distal tip of the centerbody, depending upon the operating conditions of the gas turbine in which the fuel injector is located.

The outlet port can be arranged on the axis of the centerbody, or in an off-axis position. In embodiments, more than one outlet port can be provided.

According to a further aspect, disclosed herein is a fuel nozzle for a gas turbine engine, which fuel nozzle includes one or more fuel injectors as outlined above.

The present disclosure also concerns a combustor assembly for a gas turbine engine. In one embodiment, the combustor assembly has a combustion chamber extending from an upstream end to a downstream end. The downstream end is adapted to be fluidly coupled to a turbine of the gas turbine engine and the upstream end is further adapted to be fluidly coupled to an air compressor of the gas turbine engine. The combustor assembly also has at least one fuel nozzle as outlined above.

Also disclosed herein is a gas turbine engine comprising a combustor assembly.

In the present description and annexed claims, the terms "upstream" and "downstream" refer to the direction of air, fuel or air-fuel mixture, unless differently specified.

BRIEF DESCRIPTION OF THE DRAWINGS

Reference is now made briefly to the accompanying drawings, in which.

DETAILED DESCRIPTION

To improve flame shape and flame position stability in a combustor for a gas turbine engine, a new fuel injector is provided, which has a fuel infeed chamber and a centerbody, extending along a longitudinal axis from a proximal end of the centerbody, adjacent the fuel infeed chamber, to a distal end of the centerbody. The distal end is arranged downstream of the proximal end with respect to the direction of flow of the fuel-air mixture. An outer sleeve extends around the centerbody. The outer sleeve extends from the fuel infeed chamber towards the combustion chamber and ends with an annular edge, opposite the fuel infeed chamber. The outer sleeve includes side apertures for feeding air inside an annular premix chamber, also referred to as premixer, formed between the centerbody and the outer sleeve. The centerbody includes ports for feeding fuel in the annular premix chamber.

In operation, air and fuel pre-mix in the annular premix chamber, or premixer, and the fuel-air mixture exiting the annular premix chamber burns forming a flame extending towards the interior of the combustion chamber. To improve stability of the flame, both regarding the shape as well as the position thereof, i.e. the point where it is located with respect to a fuel nozzle (which includes one or more of the new fuel injectors), the centerbody comprises a distal tip projecting outside the annular premix chamber, beyond the distal end of the outer sleeve. The distal tip projecting beyond the premix chamber, or premixer, can have a convex outer surface. In embodiments, the distal tip has a surface of revolution coaxial with the centerbody. For instance, the distal tip may have a dome shape, a spherical-cup shape, a hemispherical shape, an ogival shape or the like. In general, the distal tip has an aerodynamic shape. Advantageously, the distal tip, projecting beyond the premix chamber is connected to the portion of the centerbody inside the premix chamber with a curved surface.

Embodiments of the invention are suitable for all types of gas turbine engines, regardless of end use application. Fuel injectors disclosed herein can be used in aero-derivative gas turbines, as well as industrial, heavy duty gas turbines. In the following description reference will be made to a gas turbine for mechanical drive, but those skilled in the art will understand that the fuel injectors of the present disclosure can be used also in gas turbines for electric generation, as well as for air propulsion.

While in the following description reference is made specifically to combustors including an annular combustion chamber, it shall be understood that fuel injectors and fuel nozzles including features of the present description can be used also in other kinds of combustors, for instance including can combustion chambers or turbo-annular combustion chambers.

Figure 1:
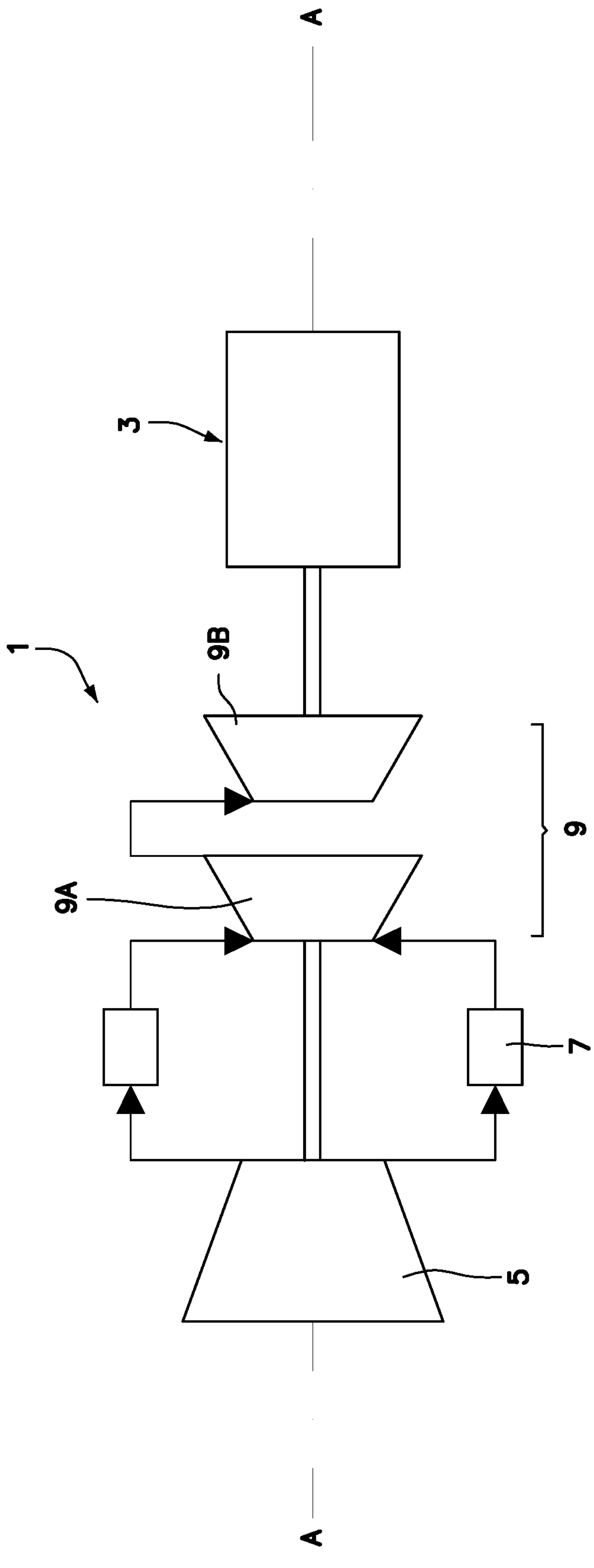
FIG. 1 is a schematic of a gas turbine engine adapted for use in various useful applications, including industrial applications.

Turning now to the drawings, FIG. 1 shows a schematic of a gas turbine engine 1 that is configured for use in various applications, including by way of example, and not limitation industrial or power generation applications, e.g. for driving a load 3. The load 3 may include a compressor or a compressor train, e.g. in one example, a refrigerant compressor, of a type that could be used in a plant for the production of liquefied natural gas, or in another example, a gas compressor in a gas pipeline. In other embodiments, when the gas turbine engine is used for power generation purposes, the load may be an electric generator.

The gas turbine engine 1 includes an air compressor 5, a combustor 7 and a turbine section 9. By way of example only, in FIG. 1 the turbine section 9 comprises a high-pressure turbine 9A and a low-pressure turbine 9B. In embodiments, the high-pressure turbine 9A is mechanically coupled to the air compressor 5 to drive the air compressor 5 in rotation. The low-pressure turbine 9B is drivingly coupled to the load 3 and provides power to drive the load 3.

The exemplary gas turbine engine of FIG. 1 is therefore a two-shaft turbine. However, fuel injectors of the present disclosure can be used with advantage also in other kinds of gas turbines, such as single-shaft gas turbines, or gas turbines with three shafts, for instance.

Figure 2:
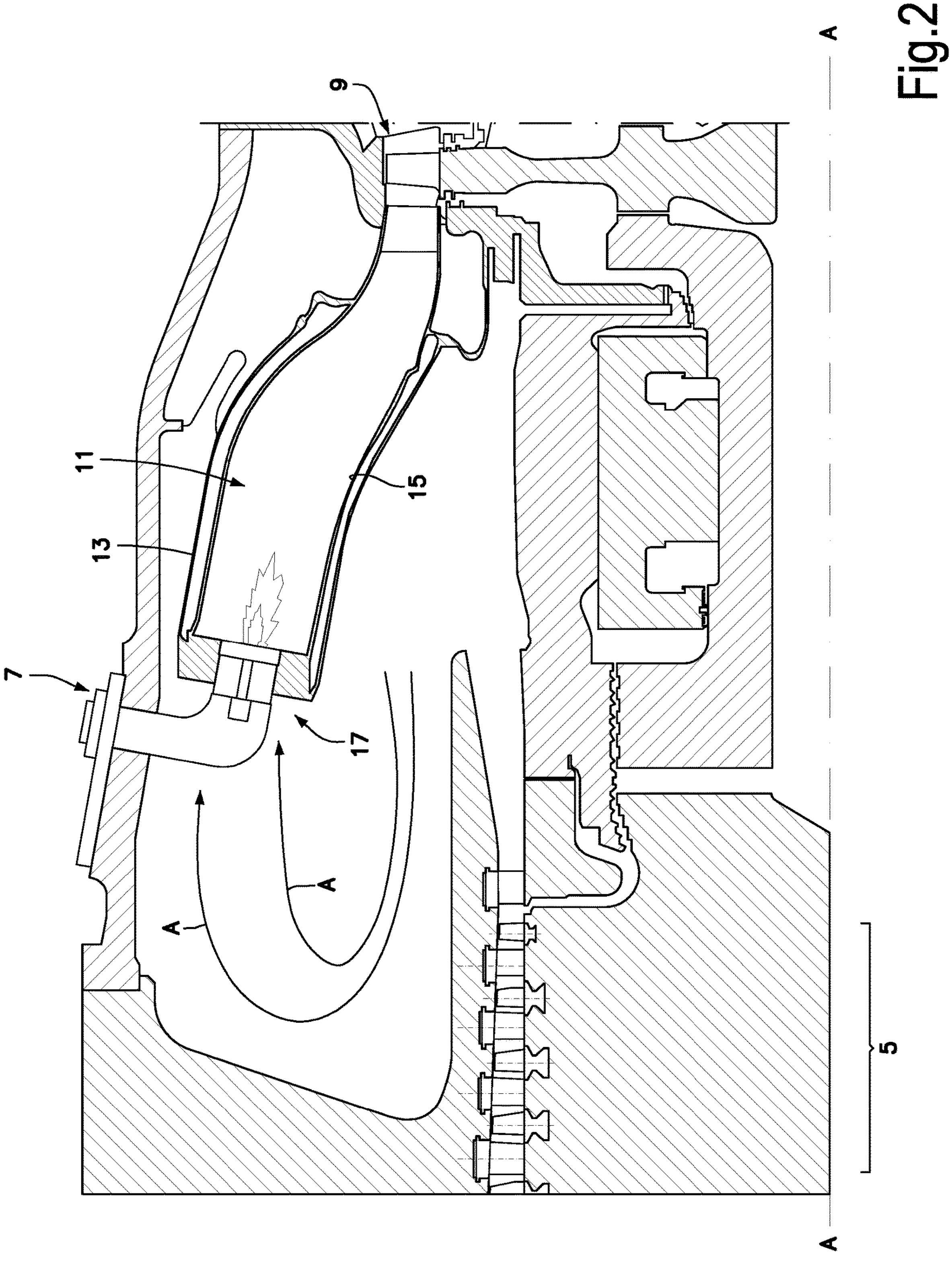
FIG. 2 is a schematic section of a combustor having a plurality of fuel nozzles and an annular combustion chamber, for a gas turbine engine.

According to some embodiments, the combustor 7 comprises an annular combustion chamber 11, as schematically shown in FIG. 2. The combustion chamber 11 comprises an outer liner 13 and an inner liner 15. The outer liner 13 and the inner liner 15 are coaxial to one another and coaxial to the rotation axis A-A of the gas turbine engine 3. The combustion chamber 11 extends in an upstream-downstream direction from the air compressor 5 to the turbine section 9. A plurality of fuel nozzles 17 are arranged in the upstream region of the combustor 7. One of said fuel nozzles 17 is shown in FIG. 3 in a perspective view and in FIG. 4 in a sectional view according to a radial plane containing the axis of rotation A-A.

Figure 3:
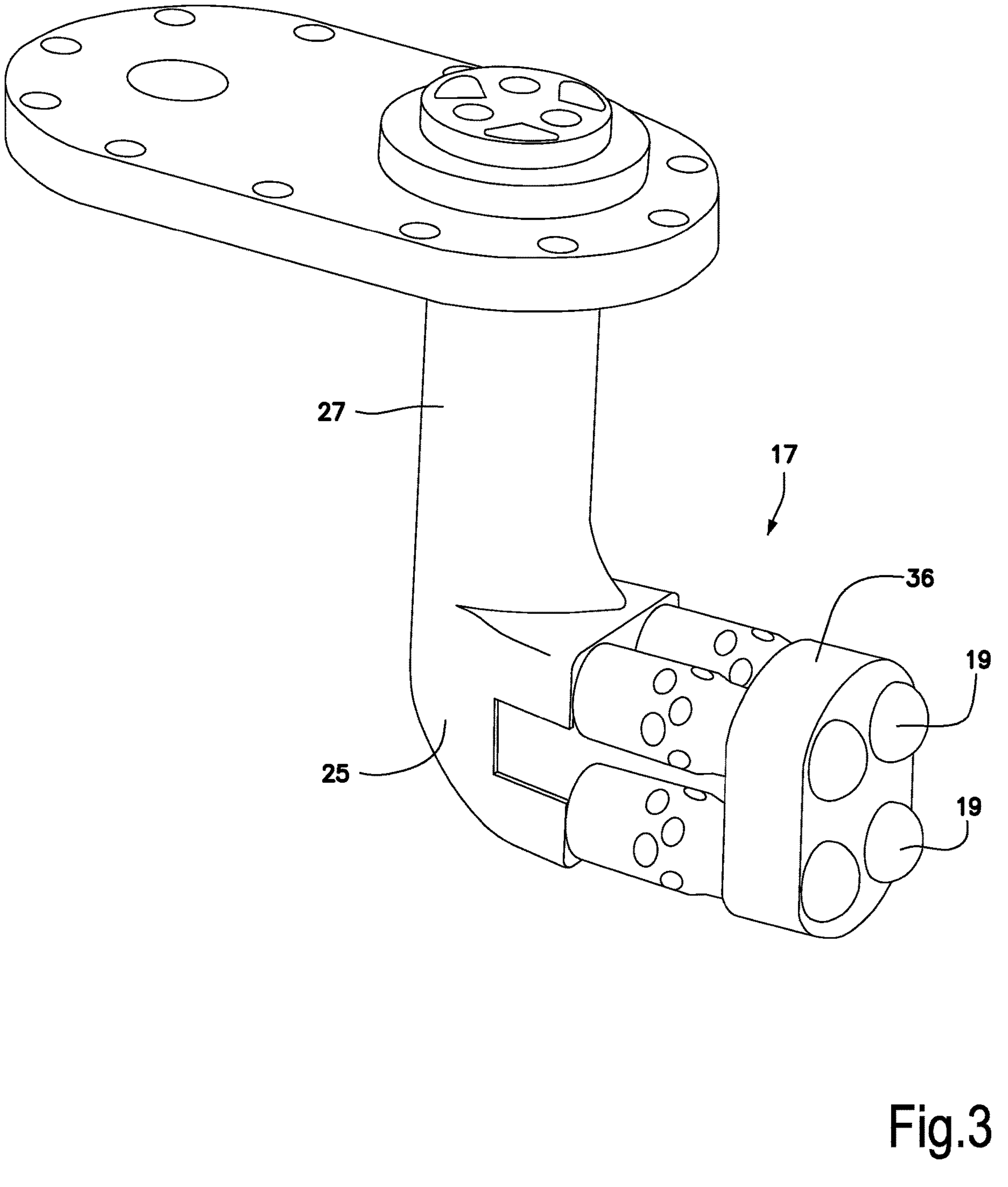
FIG. 3 is an axonometric view of a fuel nozzle.
Figure 4:
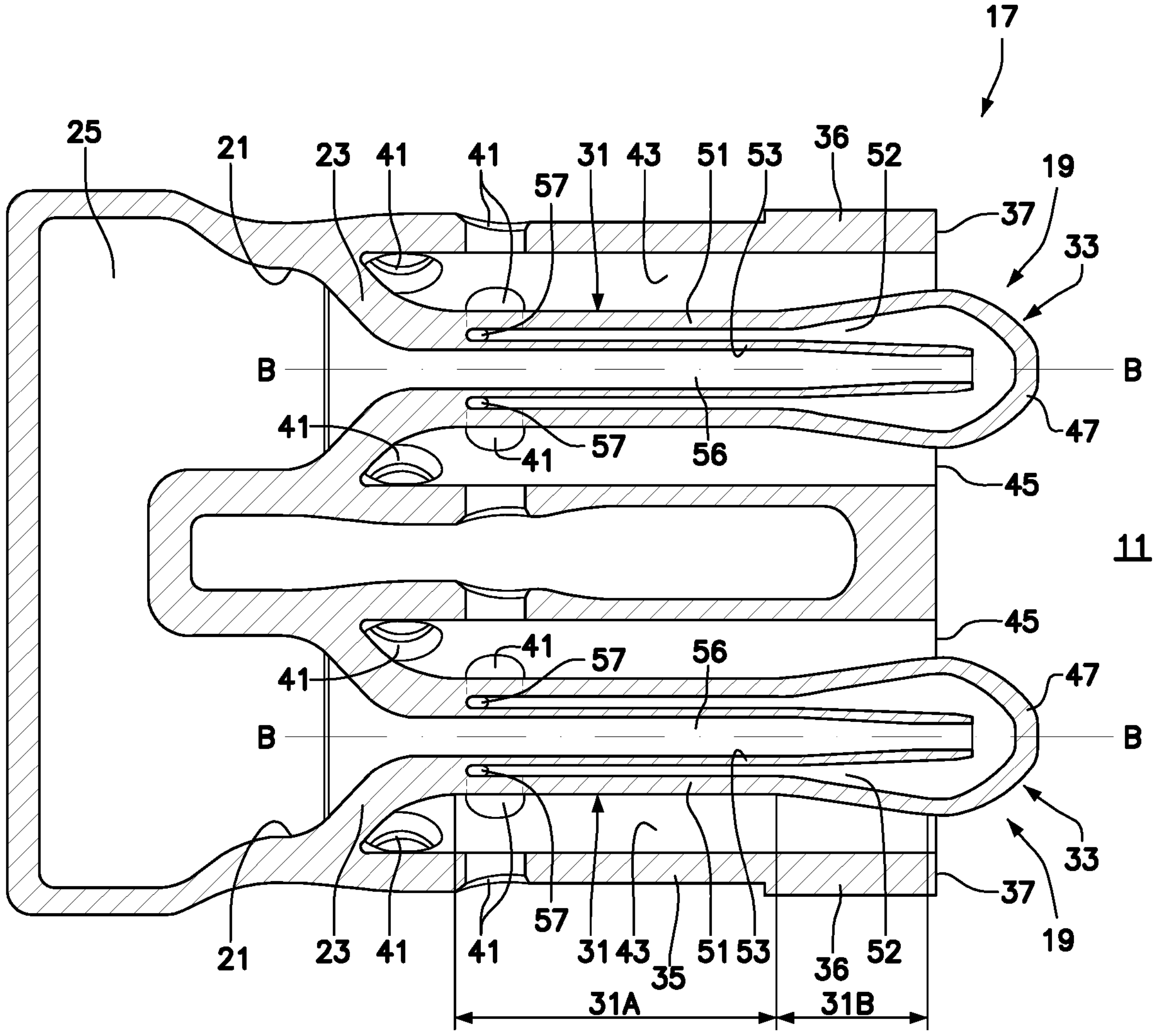
FIG. 4 is a sectional view of the fuel nozzle of FIG. 3.

Each fuel nozzle 17 generally includes a plurality of fuel injectors 19, as best shown in FIGS. 3 and 4 and disclosed in more detail hereafter. Specifically, in the embodiment shown, each fuel nozzle includes four fuel injectors. Two fuel injectors are show in cross-sectional view in FIG. 4. The number of fuel injectors 19 per fuel nozzle 17 is by way of example only. Moreover, the same combustor may include different fuel nozzles, for instance having different shapes and dimensions and possibly a variable number of fuel injectors.

Each fuel injector 19 comprises a fuel infeed chamber 21 comprising an end wall 23 facing the combustion chamber 11, i.e. oriented towards the combustion chamber 11 and the turbine section 9. The fuel infeed chambers 21 of the fuel injectors 19 belonging to the fuel nozzle 17 can be combined to form a fuel infeed plenum 25. In other embodiments, each fuel infeed chamber 21 may form an individual fuel infeed plenum 25 fluidly coupled to a single fuel injector 19.

The fuel infeed plenum 25 is in fluid communication with a fuel feed duct contained in the fuel injector structure 27 (FIG. 3), wherefrom a liquid or gaseous fuel is delivered to the fuel infeed plenum 25 and therefrom to the fuel injectors 19.

Each fuel injector 19 further includes a centerbody 31, which extends along a longitudinal axis B-B, from a proximal end, or upstream end, at the end wall 23, towards a distal end, or downstream end 33 of the centerbody 31, facing the interior of the combustion chamber 11 and the turbine section 9.

Each fuel injector 19 further comprises an outer sleeve 35. The outer sleeve 35 can be coaxial to the respective centerbody 31. In other embodiments, the centerbody 31 and the outer sleeve 35 can be not coaxial to one another.

Each outer sleeve 35 extends from a proximal end at the end wall 23 of the fuel infeed chamber 21, to a distal end 37. The outer sleeves 35 belonging to the same fuel nozzle 17 are coupled to a common front wall 36.

In the embodiment shown in FIG. 4 the centerbodies 31 and the outer sleeves 35 of a fuel nozzle 17 are all parallel to one another.

Each outer sleeve 35 comprises a plurality of air inlet ports 41 extending therethrough and in fluid communication with an annular premix chamber 43, or premixer, formed between the centerbody 31 and the outer sleeve 35. The annular premix chamber 43 has a bottom at the end wall 23 of the fuel infeed chamber 21 and an annular outlet 45 surrounded by the distal end 37 of the outer sleeve 35.

If the outer sleeve 35 and the centerbody 31 are coaxial, as shown in FIG. 4, the annular premix chamber 43 and the outlet 45 thereof have a constant radial dimension, as shown in the illustrated embodiment. As mentioned above, however, this is not binding. In some embodiments, shown, the centerbody 31 and the outer sleeve 35 can be non-coaxial. In extreme cases, the centerbody 31 and the outer sleeve 35 may be in contact with one another. The annular premix chamber 43 and the annular outlet 45 will in that case have a non-constant radial dimension, and may even have an interruption along the cross-section, if the centerbody 31 and the outer sleeve 35 contact each other, as in the area of contact the radial dimension of the annular premix chamber and/or of the annular outlet 45 will become zero. In the present description and in the annexed claims, the term "annular" encompasses also configurations where the annular premix chamber 43 and/or of the annular outlet 45 have a radial dimension which varies around the axis of the centerbody and may become zero in one or more locations around the axis B-B.

Compressed air delivered by the air compressor 5 (see arrows A in FIG. 2) enters each annular premix chamber 43 through the air inlet ports 41 and is pre-mixed with fuel delivered through fuel injection ports provided in the centerbody 31, to be described, to generate an air-fuel mixture.

The distal end 33 of each centerbody 31 features a distal tip 47, which projects in the combustion chamber 11 beyond the annular outlet 45 of the annular premix chamber 43. In some embodiments, the distal tip 47 has a convex outer surface, for instance approximately hemispherical, or dome-shaped, or in the shape of a spherical cup or ogival-shaped.

More generally, the distal tip 47 of each centerbody 31 projects beyond the annular outlet 45 of the premix chamber 43 with a portion which is shaped such as to prevent the air/fuel mixture from forming a recirculation area (negative or low axial speed).

In some embodiments, the distal tip 47 of the centerbody 31 tapers from the annular outlet 45 of the annular premix chamber 43 towards the combustion chamber 11, and may end with a cusp, or a rounded or flattened vertex. The tapering surface of the distal tip 47, which projects from the annular outlet 45 of the annular premix chamber 43 in the combustion chamber 11, is shaped to avoid gas separation from the wall and gas recirculation, such as to prevent the flame from anchoring or adhering to the centerbody 31.

In some embodiments, the distal tip 47 may have an outer convex surface, which may be defined as a surface of revolution generated by a generatrix rotating around the axis B-B of the centerbody 31. As used herein, a generatrix is a curve that, when moved along a given path, generates a surface. The path directing the motion of the generatrix is called a directrix. More specifically, in embodiments disclosed herein, where the outer convex surface is a surface of revolution, the directrix is a circumferential line. In other embodiments, the directrix can be an elliptical line.

In some embodiments, each centerbody 31 comprises a main body portion housed inside the premix chamber 43, connected to the distal tip 37 of the centerbody projecting outside the premix chamber 43, wherein the main body may have a constant or variable cross section. In some embodiments, as illustrated in the attached drawings each centerbody 31 comprises a main body portion consisting of a first, proximal portion 31A and a second, distal portion 31B. The first portion 31A is proximate to the end wall 23 of the fuel infeed chamber 21, and extending towards the distal end 33 of the centerbody 31. The second portion 31B is located intermediate the first portion 31A and the distal tip 47. The first portion 31A can have a substantially cylindrical shape with a circular or elliptical cross-section. The second portion 31B can have a tapering shape, i.e., a substantially truncated cone shape, with a circular or elliptical cross-section and a transverse dimension (diameter in the case of a circular cross section) increasing from the first portion 31A towards the distal tip 47 of the centerbody 31. The annular premix chamber 43 has consequently a constant annular cross-section along a first portion and a tapering annular cross-section, i.e., a converging cross-section, with a gradually reducing cross-sectional area, towards the annular outlet 45.

As can be appreciated from the sectional view of FIG. 4, for instance, the generatrix which defines the distal tip 47 of the centerbody 31 forms a smooth transition zone from the main portion 31A, 31B of the centerbody, which is located inside the premix chamber 43, to the distal tip 47 of the centerbody 31, which projects outside the premix chamber 43. Sharp edges in the transition zone are avoided and an aerodynamic shape of the distal tip 47 of the centerbody 31 is obtained. Smoothness of the air/fuel mixture flow without recirculation is thus improved.

A smooth transition zone, as understood herein, can be a zone devoid of sharp edges or corners. Therefore, in the area defining the transition zone the generatrix forming the outer surface of the centerbody is a curve having a continuous derivative.

The transition zone may extend up to the distal end 33 of the centerbody, i.e. to the most downstream end of the centerbody. As mentioned above, the distal tip of the centerbody can end with a cusp, or with a planar or flat surface. At said cusp or end planar or flat surface the derivative of the curve representing the profile may have a discontinuity.

In general, the smooth transition zone also includes at least a portion of the tapering distal tip 47 and preferably the entire tapering portion of the distal tip 47.

In general, the annular premix chamber 43 has a distal portion, ending at the outlet 45 thereof, with a converging shape, i.e. with a cross-sectional area which decreases in a proximal-to-distal direction, i.e. in the direction of flow of the air/fuel mixture, towards the distal tip 47 of the centerbody 31. In the embodiment shown in the attached drawings, the converging shape of the premix chamber is obtained through the conical surface of the centerbody 31 adjacent the downstream end 33 thereof. The air-fuel mixture accelerates when moving in the proximal-to-distal direction along the annular premix chamber 43 until reaching annular outlet.

When the intimately pre-mixed air/fuel mixture formed in the annular premix chamber 43 flows through the annular outlet 45, where the speed of the air/fuel mixture abruptly decreases, the aerodynamic shape of the distal tip 47 ensures a correct flame shape and flame position in the combustion chamber.

In other embodiments, a convergent distal portion of the premix chamber can be obtained by combining a cylindrical shape of the outer surface of the centerbody 31 with a conical inner surface of the distal portion of the outer sleeve 35. The distal portion of the inner surface of the outer sleeve 35 will have, in such case, a gradually decreasing inner diameter moving in the proximal-to-distal direction.

A tapering, i.e., converging, end portion of the premix chamber 43 can be obtained also with a combination of a conical distal portion of the centerbody and a conical distal portion of the inner surface of the outer sleeve 35.

To feed fuel to the annular premix chamber 43, a fuel duct is provided inside the centerbody 31. In some embodiments, the centerbody 31 comprise an axially extending outer tubular wall 51 and an axially extending inner tubular wall 53. The axially extending outer tubular wall 51 and the axially extending inner tubular wall 53 form an annular gap 52 therebetween. More specifically, the axially extending outer tubular wall 51 and the axially extending inner tubular wall 53 extend from the end wall 23 of the fuel infeed chamber 21 toward the distal tip 47 of the respective centerbody 31. The outer tubular wall 51 is integral with the distal tip 47 and the outer surface thereof merges with the convex surface of the distal tip 47 of the centerbody 31. The inner tubular wall 53 ends at a distance from the inner surface of the distal tip 47 of the centerbody 31.

A fuel conduit is thus formed inside the centerbody 31, which extends from the fuel infeed chamber 21 in a first direction along an axial cavity 56 of the inner tubular wall 53 towards the distal end 33 of the centerbody 31, and in a second opposite direction along the annular gap 52 formed between inner tubular wall 53 and outer tubular walls 51, from the distal end 33 of the centerbody 31 towards the fuel infeed chamber 21. At least one, and preferably a plurality of fuel injection ports 57 extend through the outer tubular wall 51, adjacent an end of the annular gap 52 opposite the distal end 33 of the centerbody 31. Fuel is thus delivered from the fuel infeed chamber 21 through the axial cavity 56, the annular gap 52 and the fuel injection ports 57, into the annular premix chamber 43.

In the annular premix chamber 43 the fuel is mixed with compressed air fed by the air compressor 5 of the gas turbine engine 1 and flowing through the air inlet ports 41. Intimately pre-mixed fuel-air mixture formed in the annular premix chamber 43 flows through the annular outlet 45. Once the mixture has been ignited, a flame forms downstream of the distal end 33 of each fuel injector 19 and is sustained by premixed air and fuel continuously fed through the annular premix chamber 43.

It has been discovered that with the above-described enhanced shape and geometry of the distal tip 47 of the centerbody 31, the flame is stable regarding both the shape and the position thereof even under variable operating conditions of the combustor and of the gas turbine engine 1. This results in reduction of noxious emissions, more regular thermal load, reduction of combustion noise and vibrations and in general more efficient control of the combustion conditions.

Specifically, the enhanced shape of the centerbody 31, and in particular of the distal tip 47 thereof, with a smooth transition zone from the main body portion inside the premix chamber 43 to the distal tip 47 outside the premix chamber, results in an aerodynamic shape of the centerbody. The improved aerodynamic shape provides a more uniform flow of the air/fuel mixture, higher velocity and absence of flow recirculation, thus avoiding the risk of the flame becoming anchored to the centerbody or the distal end 37 of the outer sleeve 35. Flame stability is improved and risk of thermal damages to the fuel nozzle due to anchoring of the flame to metal parts of the fuel nozzle is largely prevented.

Figure 5:
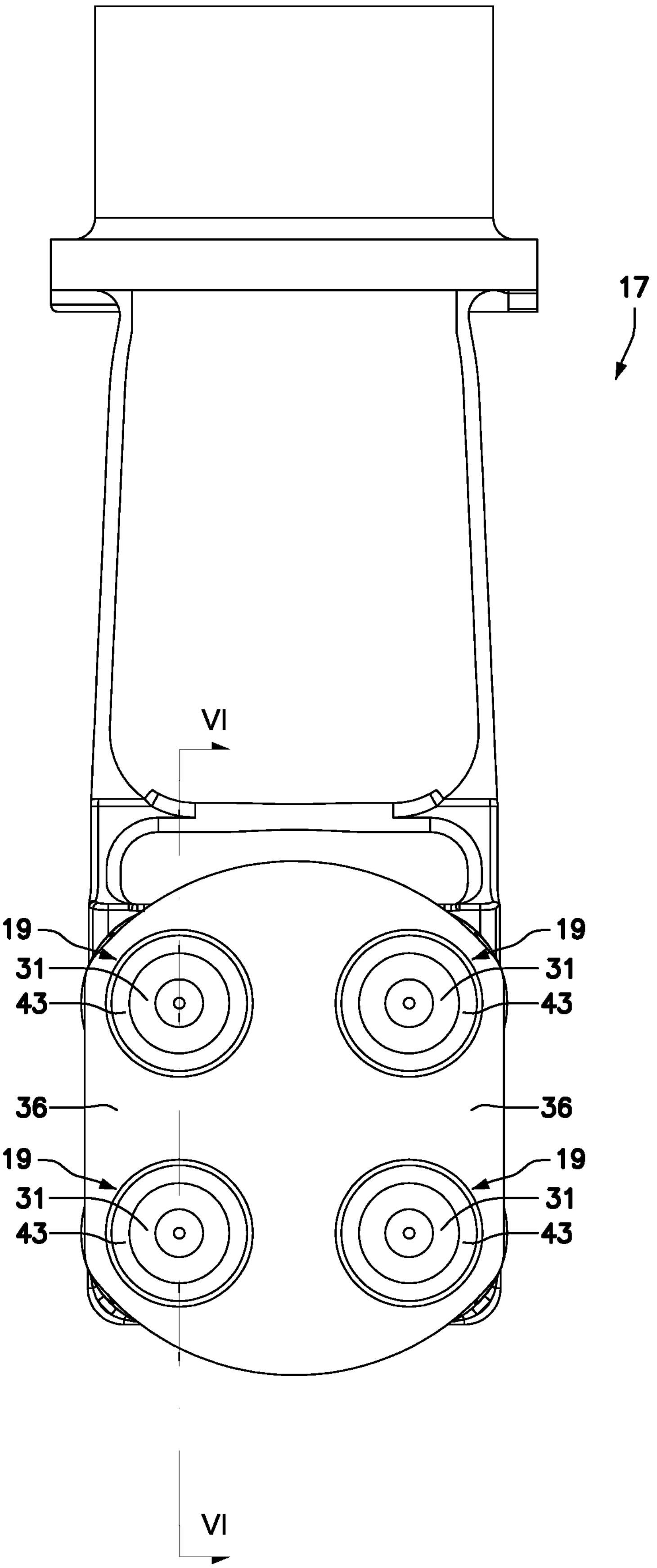
FIG. 5 is a front view of a fuel nozzle in a further embodiment.
Figure 6:
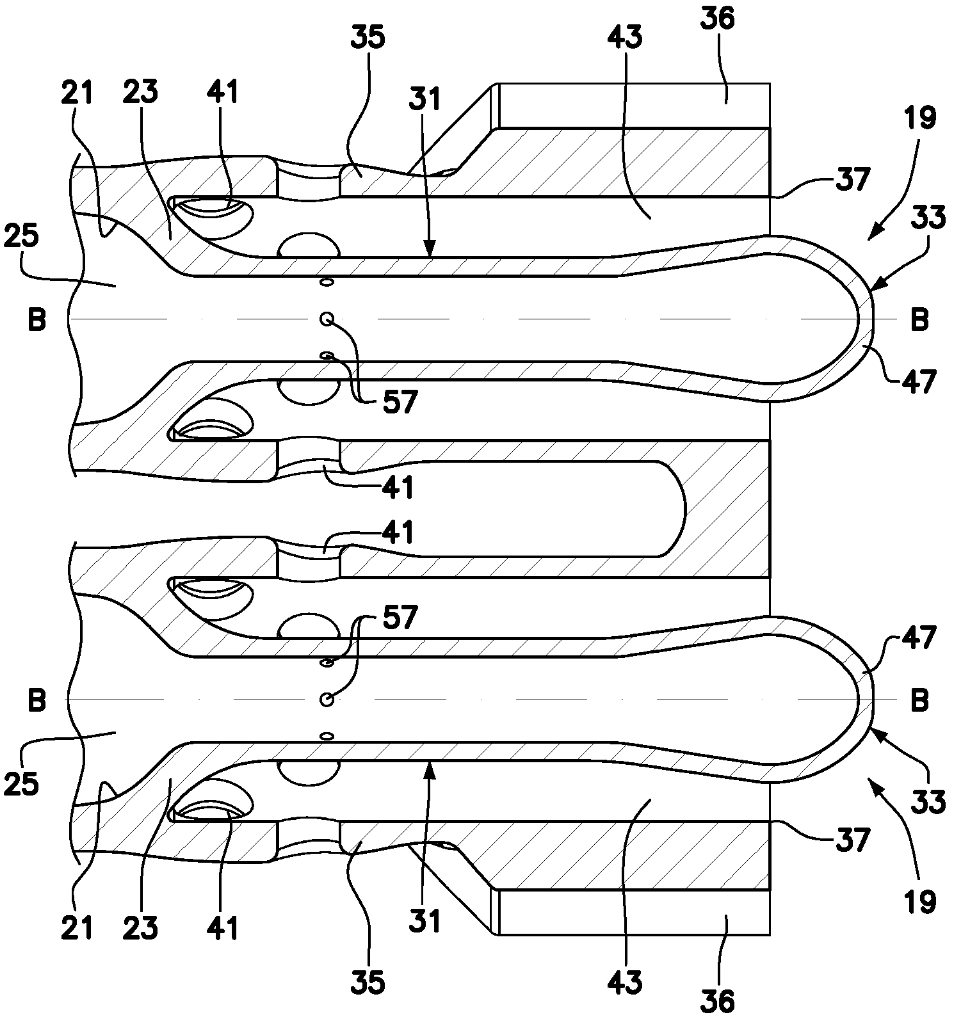
FIG. 6 is a sectional view according to line VI-VI of FIG. 5.

FIGS. 5 and 6 show another embodiment of a fuel nozzle 17 according to the present disclosure. The same reference numbers are used to designate parts, elements and components already illustrated in FIG. 4. The main difference between the embodiment of FIG. 4 and the embodiment of FIGS. 5 and 6 concerns the interior of the centerbodies 31 and the fuel delivery path. In the embodiment of FIGS. 5 and 6, each centerbody 31 comprises a plurality of fuel injection ports 57 arranged near the proximal end of the centerbody 31, preferably in the area where the air inlet ports 41 are positioned. The fuel injection ports 57 provide a fluid connection between the interior of the centerbody 31 and the annular premix chamber 43. The interior of the centerbody 31 is devoid of the inner tubular wall 53 and simply forms an extension of the fuel infeed chamber 21.

Figure 7:
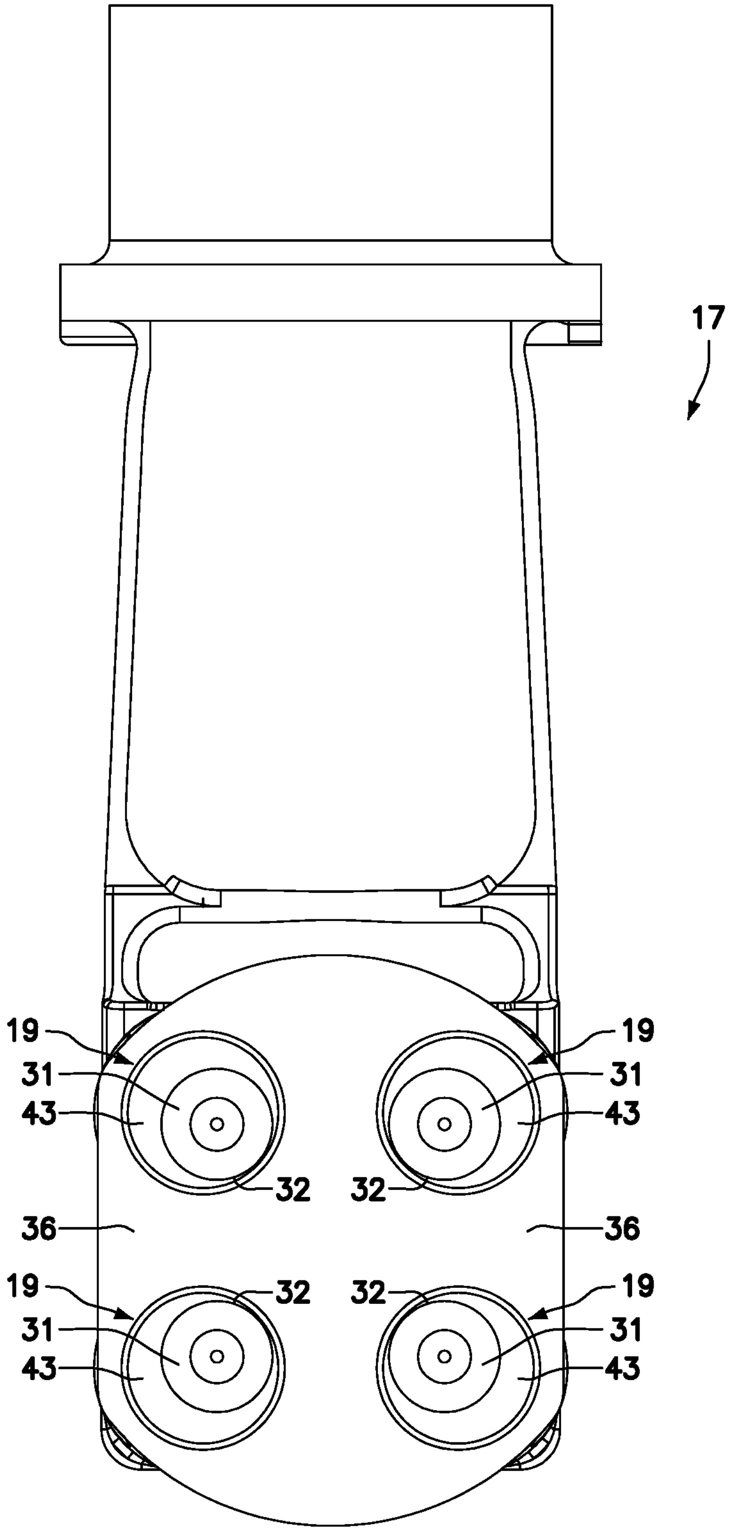
FIG. 7 is a front view of a fuel nozzle in a further embodiment.

While in the embodiment of FIGS. 5 and 6 each centerbody 31 is coaxial with the respective outer sleeve 35, as previously mentioned, in other configurations a different, non-coaxial arrangement can be provided. FIG. 7 illustrates a front view similar to FIG. 5 of a further embodiment, where each centerbody 31 is non-coaxial with respect to the corresponding outer sleeve 35. Due to the non-coaxial arrangement, the annular premix chamber 43 has a variable radial dimension around the axis B-B of the centerbody 31.

In the embodiment of FIG. 7, each centerbody 31 contacts the inner surface of the outer sleeve 35 at 32 and therefore the annular premix chamber 43 has a minimum radial dimension at 32, which is equal to zero. In other embodiments, the non-coaxial arrangement may however be such that the centerbody 31 does not touch the inner surface of the outer sleeve 35.

Figure 8:
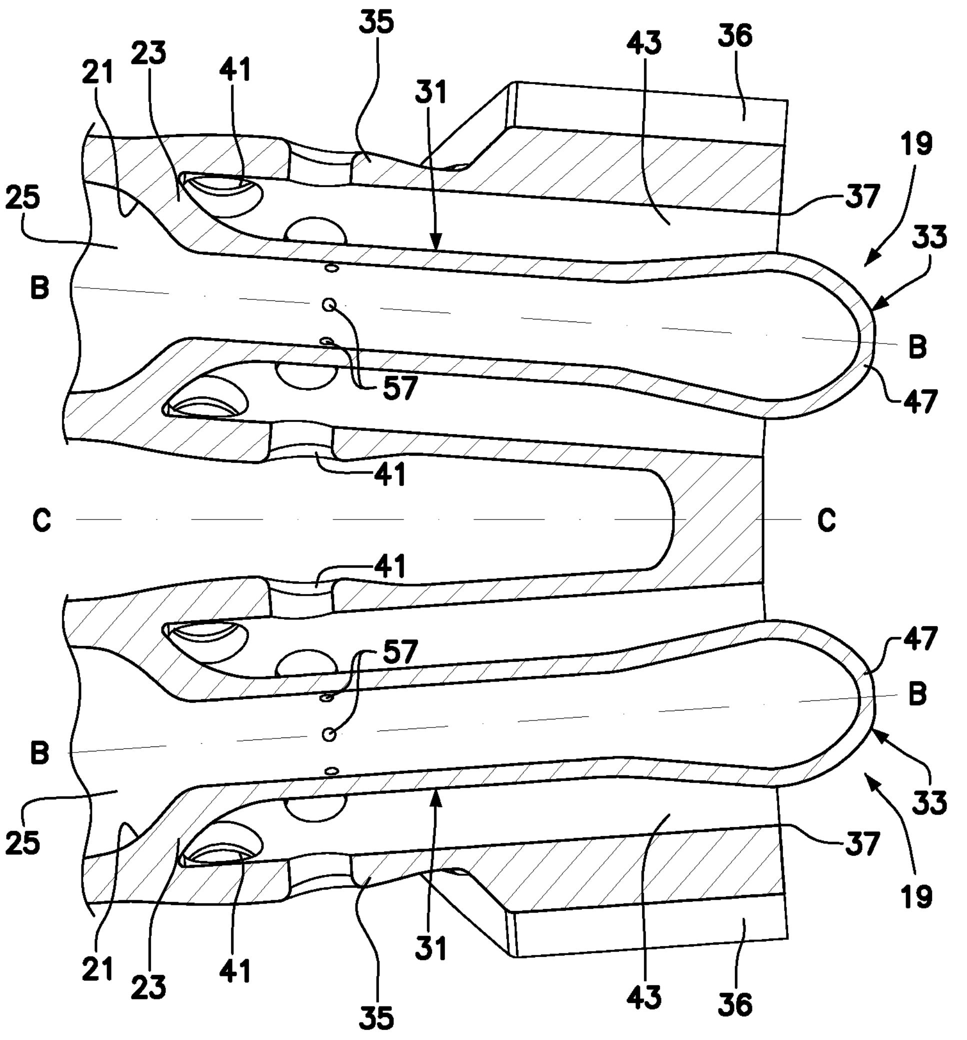
FIG. 8 is a sectional view similar to FIG. 6 of a further embodiment.

In the embodiments disclosed so far, the fuel injectors 19 are parallel to one another, i.e., the axes B-B of the centerbodies 31 and the axes of the outer sleeves 35 are all parallel to one another. In other embodiments, at least two fuel injectors 19 can be non-parallel to one another. FIG. 8 illustrates a sectional view similar to FIG. 7 of a fuel nozzle 17 including fuel injectors 19, which are arranged in a converging configuration, such their axes B-B converge towards a point located in the combustion chamber 11. All four fuel injectors 19 may converge towards a central axis C-C of the fuel nozzle 17. Alternatively, the axes B-B of two pairs of fuel injectors 19 may be arranged in a convergent configuration on two parallel planes.

The non-coaxial arrangement of FIG. 7 and the non-parallel arrangement of FIG. 8 can be combined to one another.

In the embodiments described so far, the distal tip 47 has a fully convex shape, with a tapering shape, i.e., with a cross-section that reduces moving from proximal to distal. In other embodiments, the outer surface of the distal tip 47 may be not fully convex. For instance, the distal tip 47 may have a convex outer surface, with grooves extending along planes containing the axis B-B of the centerbody 31, defining flow-guiding channels extending towards the vertex, i.e., the most downstream point, of the distal tip 47 of the centerbody 31.

Figure 9:
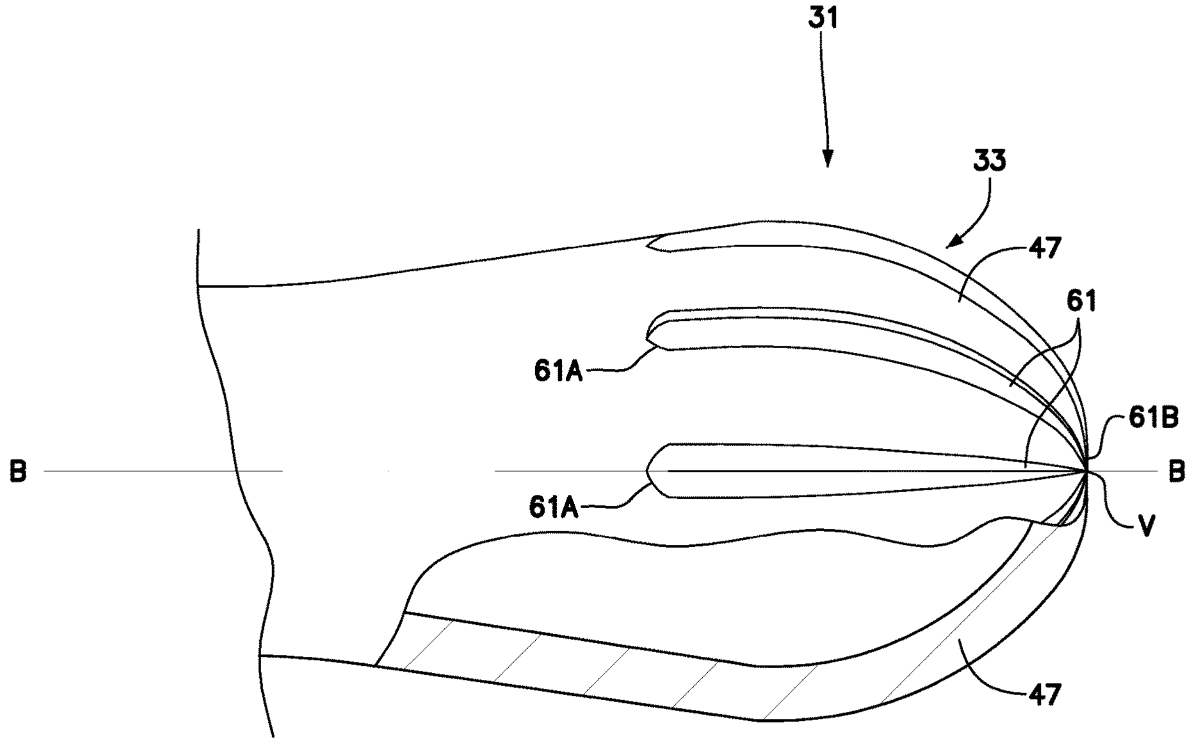
FIG. 9 is an enlarged detail of the distal end of a centerbody in a yet further embodiment.

An exemplary embodiment of a distal tip with a grooved outer surface is shown in FIG. 9. The centerbody 31 of FIG. 9 can be used in any one of the previously described embodiments. The grooves or channels along the outer surface of the distal tip of the centerbody 31 are labeled 61. In the exemplary embodiment of FIG. 9, the grooves 61 extend from a first end 61A positioned along the largest circumference of the distal tip 47, to a second end 61B positioned at the vertex V of the distal tip 47. Other embodiments may include shorter grooves.

In the embodiment of FIG. 9, the distal tip 47 is still broadly convex and tapered from a larger section facing the proximal end of the centerbody 31, to a narrower section at the vertex V of the distal tip 47.

Figure 10:
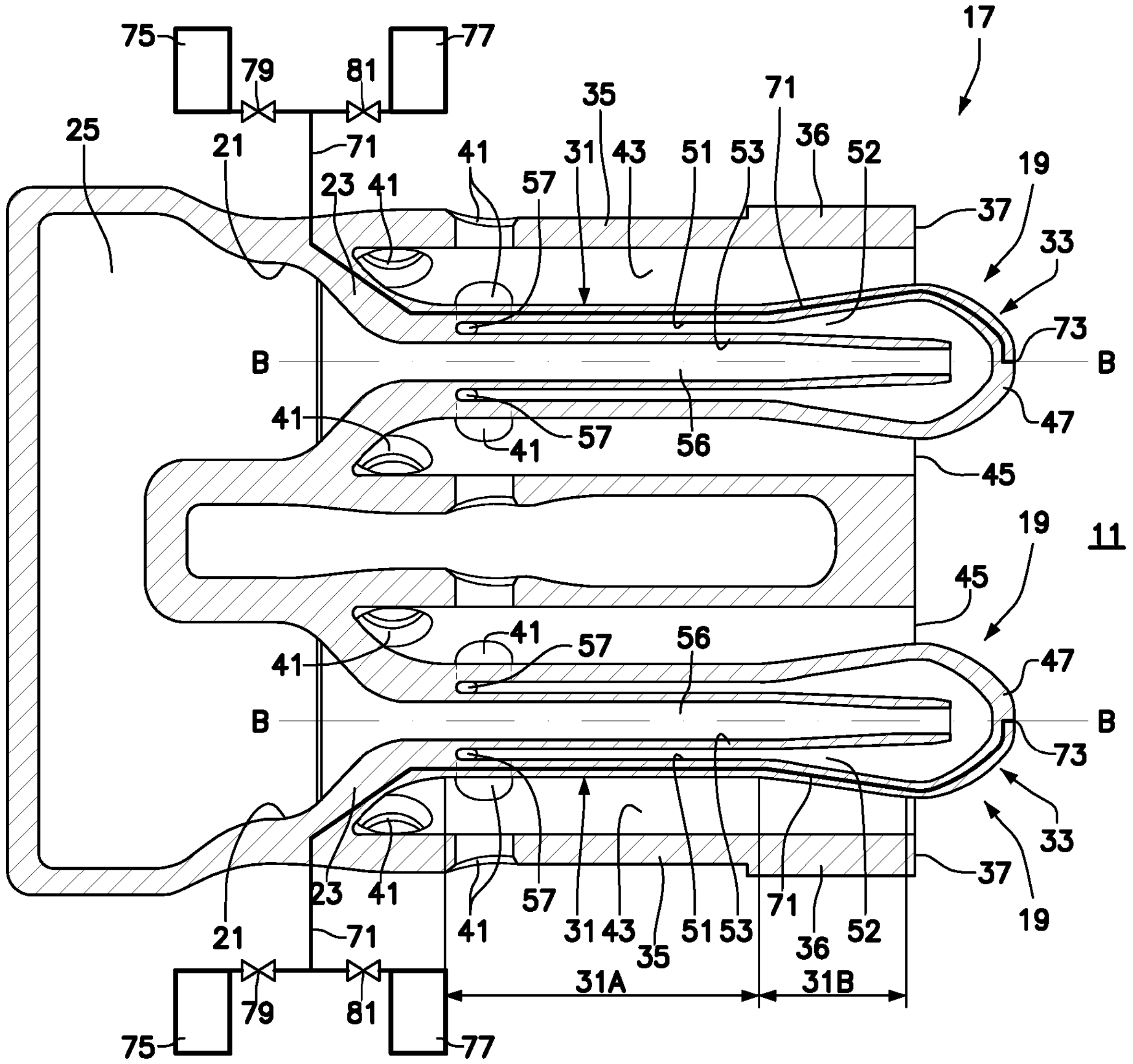
FIGS. 10 and 11 are sectional views of a fuel nozzle in yet further embodiments.

A further embodiment of a fuel injector and fuel nozzle according to the present disclosure is shown in FIG. 10. The same reference numbers used in FIGS. 1 to 9 designate the same or similar parts or components, which will not be described again.

In order to further enhance control of the flame, according to the embodiment of FIG. 10, in addition to the fuel duct ending with the fuel injection ports 57, the centerbody 31 further features an additional fluid conduit, which extends along the centerbody 31 and ends with one or more outlet ports at the distal tip or downstream end 33 of the centerbody 31. In the embodiment of FIG. 10, the additional fluid conduit is labeled 71 and the outlet port is labeled 73.

In the embodiment of FIG. 10, the additional fluid conduit 71 has a single outlet port 73 positioned at the top of the dome-shaped distal tip 47. In further embodiments, not shown, the additional fluid conduit 71 may be fluidly coupled to a plurality of outlet ports 73, preferably arranged in axial-symmetrical positions around the axis B-B of the centerbody 31. In yet further embodiments, not shown, more than one additional fluid conduit 71 can be provided within the centerbody 31, each conduit being fluidly coupled to one or more outlet ports.

The outlet ports 73 may be circular. In other embodiments, e.g., if the ports are arranged around the axis B-B of the centerbody 31, the outlet ports 73 may have an elongated shape, for instance in a tangential direction around the axis B-B of the centerbody 31, or they may be elongated in a longitudinal direction.

In some embodiments, the additional fluid conduit 71 is coupled with a source of fluid schematically shown at 75, or with two sources of fluid shown at 75 and 77. In some currently preferred embodiments, the fluid source 75 can be a source of combustion air. In other embodiments, the fluid source 75 can be a source of fuel. If two fluid sources 75, 77 are provided, one fluid source can be an air fluid source and the other can be a fuel source.

Control valves 79, 81 can be provided to control the fluid flow towards and through the one or more additional fluid conduits 71. For instance, one valve 79 can be provided to control a flow of additional combustion air from the source 75 towards the one or more outlet ports 73. A valve 81 can be provided to control a flow of additional fuel from the source 77 towards the one or more outlet ports 73.

In some embodiments, if two or more additional fluid conduits 71 are provided in the centerbody 31, at least one of them may be fluidly coupled with a source of combustion air and the other with a source of fuel.

Through the additional fluid conduit(s), additional combustion air, additional fuel, or a mixture of air and fuel can be delivered at the distal tip of the centerbody 31, to provide an additional means of controlling the shape of the flame. Additional combustion air and/or fuel can be delivered to the distal tip of the centerbody 31 depending upon the operating conditions of the combustor 7, to provide optimum control of the combustion process, enhance shape and position stability of the flame, prevent the flame from attaching to the distal tip of the centerbody 31, i.e., to the burner.

Furthermore, the additional fluid conduit(s) prevent ignition of the flame in low velocity regions and reduce the risk of acoustic interaction. Enhanced thermoacoustic response and reduced emissions, as well as better control of wall tip temperature and durability of the burner are achieved.

Figure 11:
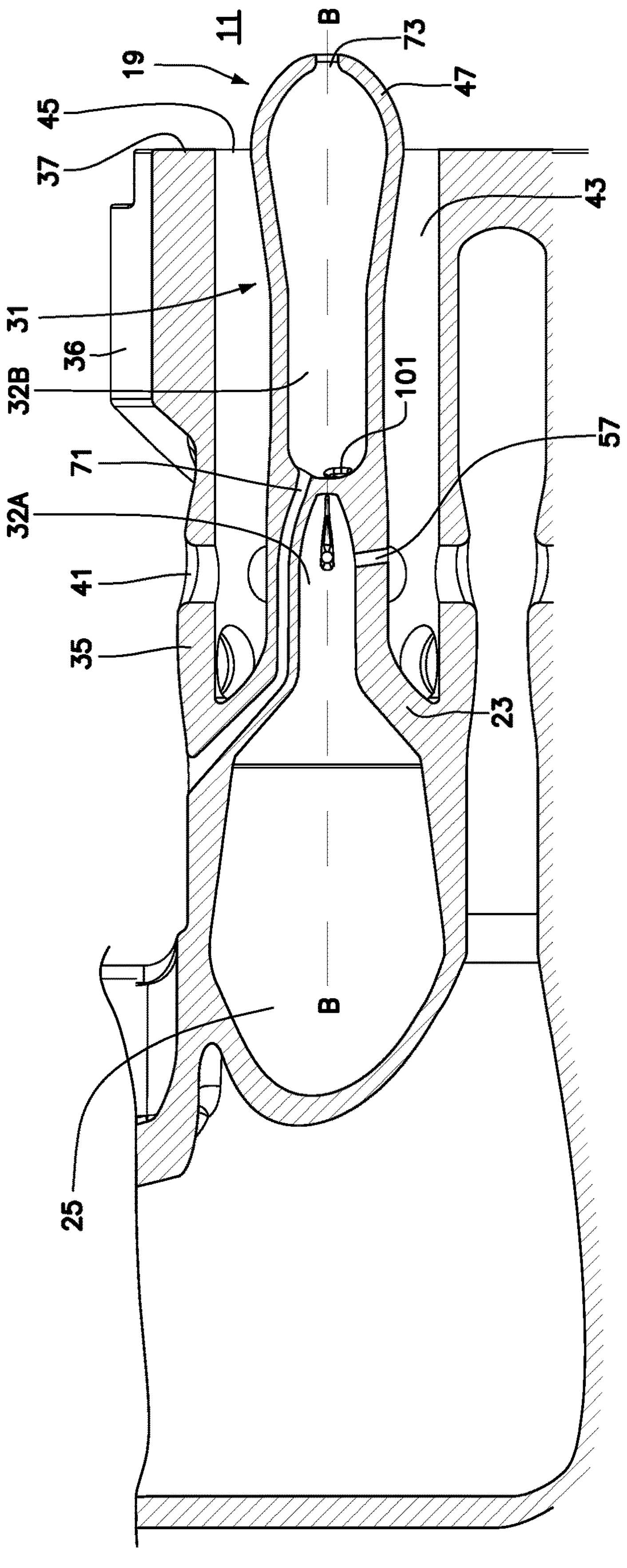

A further embodiment of a fuel nozzle including a plurality of fuel injectors is shown in FIG. 11. The same reference numbers in FIG. 11 designate the same or equivalent components already described in connection with the previous FIGS. 1 to 10, which will not be described in detail again. In the embodiment of FIG. 11, each centerbody 31 has an internal partition wall 101, which divides the hollow space inside the centerbody 31 into a first inner volume 32A consisting in an extension of the respective fuel infeed chamber 21, and a second inner volume 32B, which extends from the partition wall 101 to the distal tip. One or more fuel injection ports 57 extend from the first inner volume 32A to the annular premix chamber 43, to deliver a flow of fuel from the fuel infeed chamber 21 towards the annular premix chamber 43, where the fuel is mixed with air flowing through the air inlet ports 41 provided in the approximately cylindrical wall of the outer sleeve 35.

While in FIG. 11 only one fuel injection port 57 is shown, it will be understood that two or more fuel injection ports 57 can be provided, preferably circumferentially arranged around the axis B-B of the centerbody 31.

The second inner volume 32B is in fluid communication with at least one additional fluid conduit 71. An outlet port 73 at the outermost end of the distal tip 47 provides a fluid communication between the second inner volume 32B and the combustion chamber 11.

As mentioned above with regard to FIG. 10, the additional fluid conduit 71 may deliver an additional air flow, or an additional fuel flow, or an additional combined fuel and air flow towards the distal tip 47 and through the outlet port 73 of the centerbody 31.

Figure 12:
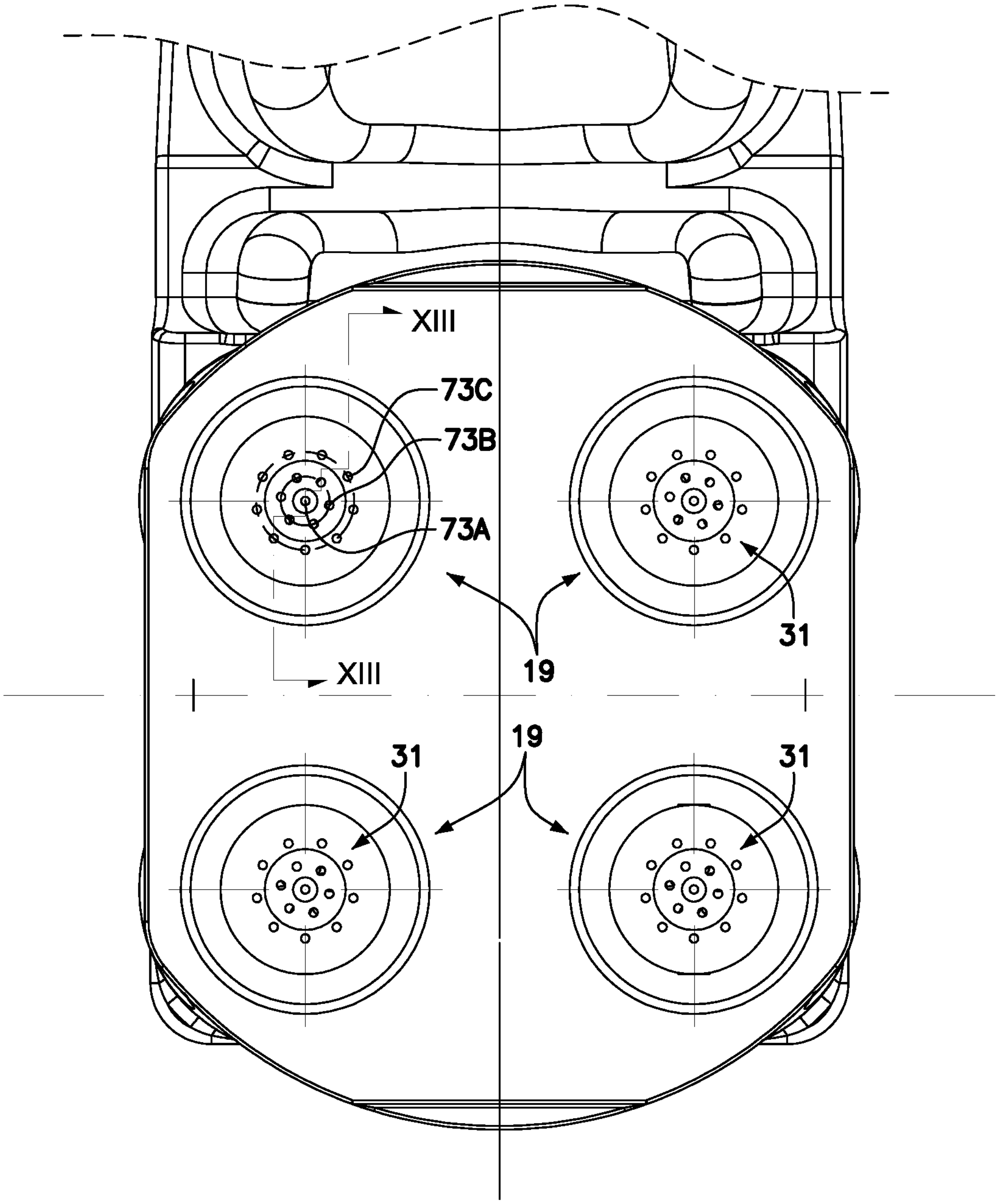
FIG. 12 is a front view of a fuel nozzle in yet a further embodiment.
Figure 13:
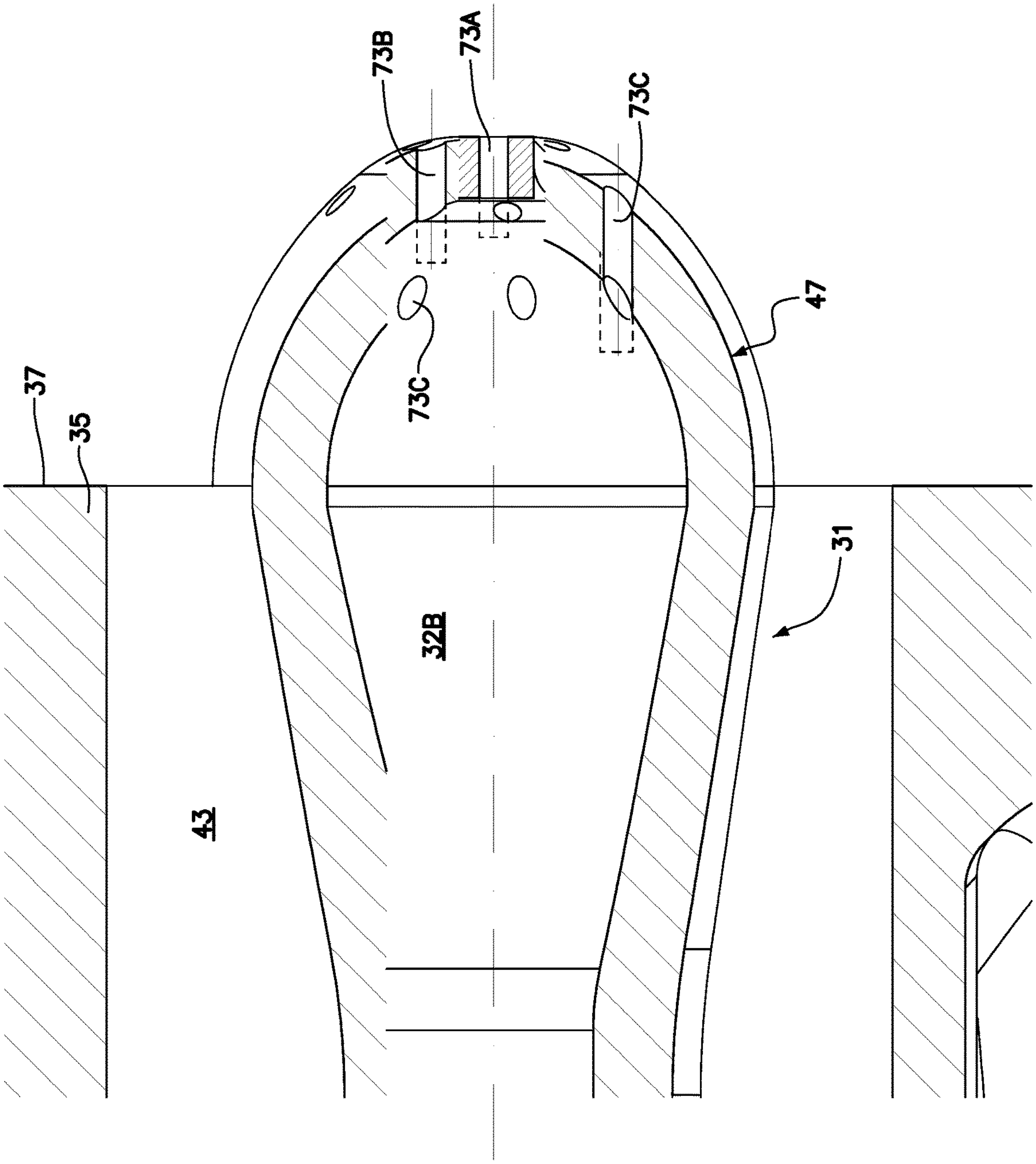
FIG. 13 is a sectional view according to line XIII-XIII of FIG. 12.

A yet further embodiment of a fuel nozzle including a plurality of fuel injectors is shown in FIGS. 12 and 13. The same reference numbers are used to designate the same elements shown in the previously described figures, and which will not be described again. The embodiment of FIGS. 12 and 13 differs from the embodiment of FIG. 11 mainly in that a plurality of outlet ports 73 are provided in the distal tip 47 of the centerbody 31. More specifically, a central outlet port 73A is located on the center of the distal tip 47, on the axis of the centerbody 31. A first set of additional outlet ports 73B are distributed along a first circumference centered on the axis of the centerbody 31. A second set of additional outlet ports 73C are distributed along a second circumference centered on the axis of the centerbody 31. The ports 73A, 73B, 73C may have the same cross section and may be for instance circular. In other embodiments, the ports may have a cross section of variable dimensions and/or shapes. The position of the ports and the number of circular arrangements of said ports can also vary according to design options.

Exemplary embodiments have been disclosed above and illustrated in the accompanying drawings. It will be understood by those skilled in the art that various changes, omissions and additions may be made to that which is specifically disclosed herein without departing from the scope of the invention as defined in the following claims.

The invention claimed is:

1. A fuel injector for a gas turbine engine, the fuel injector comprising:

a fuel infeed chamber comprising an end wall;

a centerbody extending along a longitudinal axis from the end wall to a distal end of the centerbody, the centerbody forming a distal tip and having fuel injection ports;

an outer sleeve surrounding the centerbody and extending along the longitudinal axis of the centerbody from the end wall to a distal end of the outer sleeve opposite the fuel infeed chamber;

an annular premix chamber disposed between the outer sleeve and the centerbody, the annular premix chamber comprising an annular outlet at the distal end of the outer sleeve;

an air inlet port extending through the outer sleeve and in fluid communication with the annular premix chamber; and a fuel conduit formed in the centerbody in fluid communication with the fuel infeed chamber and with the annular premix chamber;

wherein the distal tip projects outside the annular premix chamber beyond the distal end of the outer sleeve, wherein the distal tip has a convex outer surface with a tapering shape, and wherein the fuel injection ports permit flow of fuel from the fuel conduit to the annular premix chamber.

2. The fuel injector of claim 1, wherein the convex outer surface of the distal tip is a surface of revolution coaxial with the centerbody.

3. The fuel injector of claim 1, wherein the distal tip has one of a dome shape, a spherical-cup shape, a hemispherical shape and an ogival shape.

4. The fuel injector of claim 1, wherein the premix chamber has a convergent distal portion with a cross-sectional area tapering in a proximal-to-distal direction up to the annular outlet of the premix chamber.

5. The fuel injector of claim 1, wherein the centerbody has a distal portion ending at the distal tip and having a conical shape with a cross section increasing towards the distal tip.

6. The fuel injector of claim 1, wherein the centerbody has a main portion inside the premix chamber, and wherein the main portion and the distal tip are connected by a smooth transition zone tapering towards the distal end of the centerbody.

7. The fuel injector of claim 1, wherein the centerbody has a main portion inside the premix chamber, wherein the main portion is connected to the distal tip along a transition zone tapering towards the distal end of the centerbody, and wherein the transition zone is formed by a surface generated by a generatrix having a continuous derivative.

8. The fuel injector of claim 1, wherein the centerbody comprises:

a first portion proximate to the end wall of the fuel infeed chamber and extending towards the distal tip of the centerbody, and a second portion intermediate the first portion and the distal tip, wherein the first portion has a cylindrical shape with a circular cross-section, and wherein the second portion has a tapering shape with a circular cross-section and a diameter increasing from the first portion to the distal tip.

9. The fuel injector of claim 1, wherein the centerbody and the outer sleeve are coaxial.

10. The fuel injector of claim 1, wherein the centerbody and the outer sleeve are non-coaxial and the annular premix chamber has a radial dimension which varies around the longitudinal axis of the centerbody.

11. The fuel injector of claim 1, wherein the centerbody comprises an additional fluid conduit extending along the centerbody and fluidly coupled to an outlet port at the distal tip of the centerbody.

12. The fuel injector of claim 11, wherein the additional fluid conduit is adapted to deliver to the outlet port at least one of: combustion air, fuel, or an air/fuel mixture.

13. The fuel injector of claim 11, wherein the outlet port is positioned on the longitudinal axis of the centerbody.

14. The fuel injector of claim 11, further comprising:

a plurality of outlet ports fluidly coupled with the additional fluid conduit and distributed according to a circular arrangement around the axis of the centerbody.

15. The fuel injector of any one of claim 11, further comprising:

a further additional fluid conduit extending along the centerbody and fluidly coupled to a further outlet port at the distal end of the centerbody, wherein the further additional fluid conduit is adapted to deliver fuel to the further outlet port.

16. A fuel nozzle for a gas turbine engine, the fuel nozzle comprising the fuel injector of claim 1.

17. The fuel nozzle of claim 16, wherein the fuel nozzle comprises a plurality of the fuel injector of claim 1.

18. The fuel nozzle of claim 17, further comprising:

a front wall, wherein the outer sleeves of the fuel injectors are connected to the front wall.

19. The fuel nozzle of claim 17, wherein the fuel injectors are parallel to one another.

20. The fuel nozzle of claim 17, wherein at least two of the fuel injectors have converging axes.

21. A combustor assembly for a gas turbine engine, the combustor assembly comprising:

a combustion chamber extending from an upstream end to a downstream end, wherein the downstream end is adapted to be fluidly coupled to a turbine section of the gas turbine engine and the upstream end is adapted to be fluidly coupled to an air compressor of the gas turbine engine;

at least one fuel nozzle according to claim 16; and a fuel delivery duct fluidly coupled to the fuel injectors of the fuel nozzles.

22. A gas turbine engine comprising the combustor assembly of claim 21.

* * * * *